United States Patent

Zbiegien

[15] 3,703,232
[45] Nov. 21, 1972

[54] CONTAINER ORIENTING APPARATUS

[72] Inventor: Stanley J. Zbiegien, 5014 West Diversey Avenue, Chicago, Ill. 60639

[22] Filed: Oct. 19, 1970

[21] Appl. No.: 81,650

[52] U.S. Cl...............198/33 AD, 193/43 R, 221/171, 221/179, 221/254
[51] Int. Cl...............................................B65g 47/24
[58] Field of Search....193/43 B, 43 C, 43 D, DIG. 1; 221/171, 172, 173, 179, 254; 198/33 AD

[56] References Cited

UNITED STATES PATENTS

| | | | |
|---|---|---|---|
| 2,364,243 | 12/1944 | Riddle | 193/43 C |
| 3,532,202 | 10/1970 | Ochs | 193/43 C |
| 1,760,441 | 5/1930 | Risser | 193/43 C |

*Primary Examiner*—Evon C. Blunk
*Assistant Examiner*—Douglas D. Watts
*Attorney*—John J. Kowalik

[57] ABSTRACT

Apparatus for positioning containers upright from a disoriented pile in a hopper. A divider ramp with an inclined upper groove picks up a row of containers which orient with their major axes lengthwise of the groove. The containers slide downwardly endwise into an orienting tube which provides a pair of inclined transversely displaced surfaces spaced less than the maximum width of the containers and between which each container tumbles over upside down in upright position with its center of gravity below the axis of rotation. Each container as it tumbles once or slides down the spaced surfaces enters a pocket in a metering wheel extending between the surfaces. The wheel deposits each container in upright position into a vertical tube to a second metering wheel which deposits the container into a holder indexed therebeneath by a conveyor.

10 Claims, 6 Drawing Figures

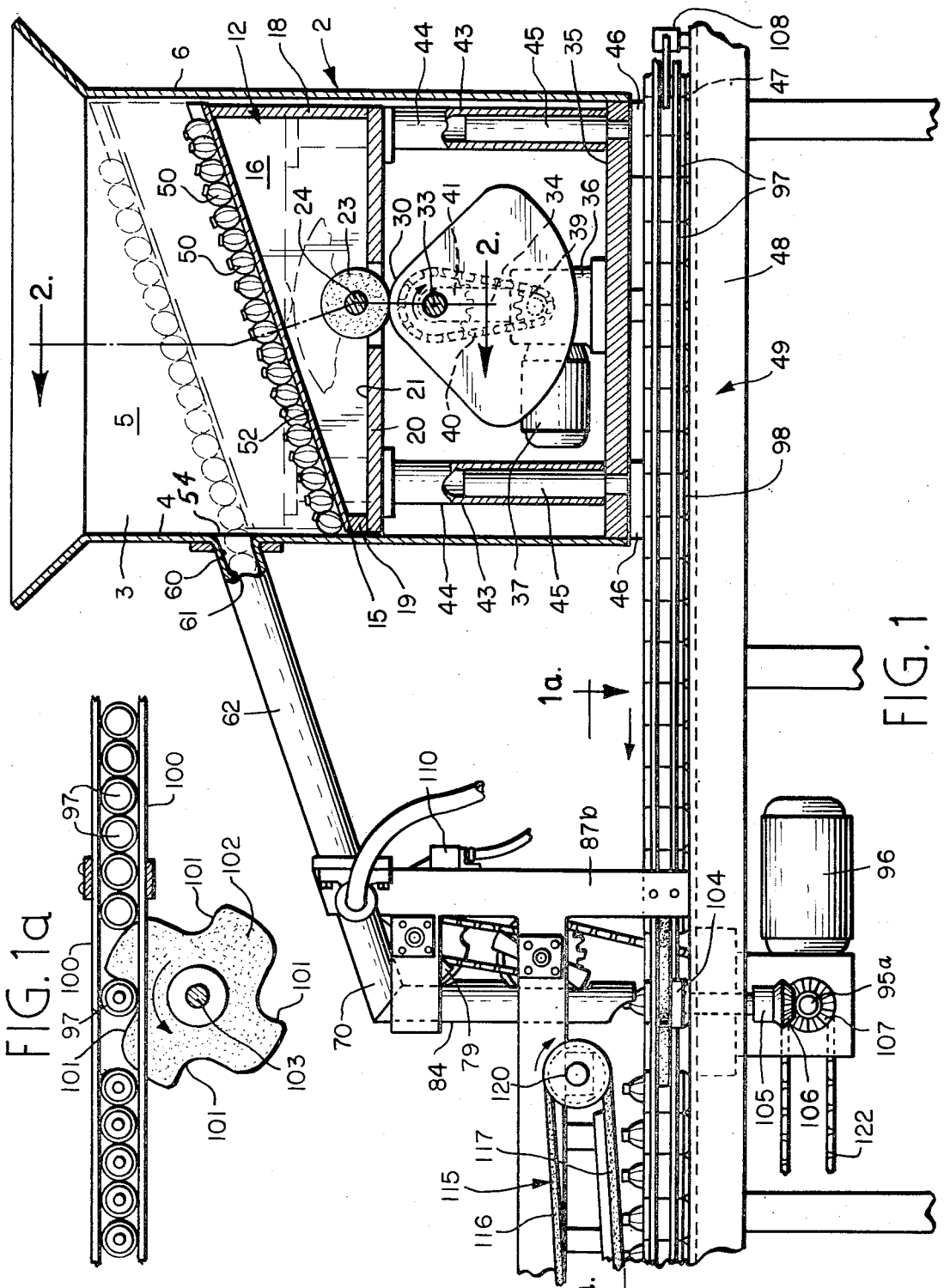

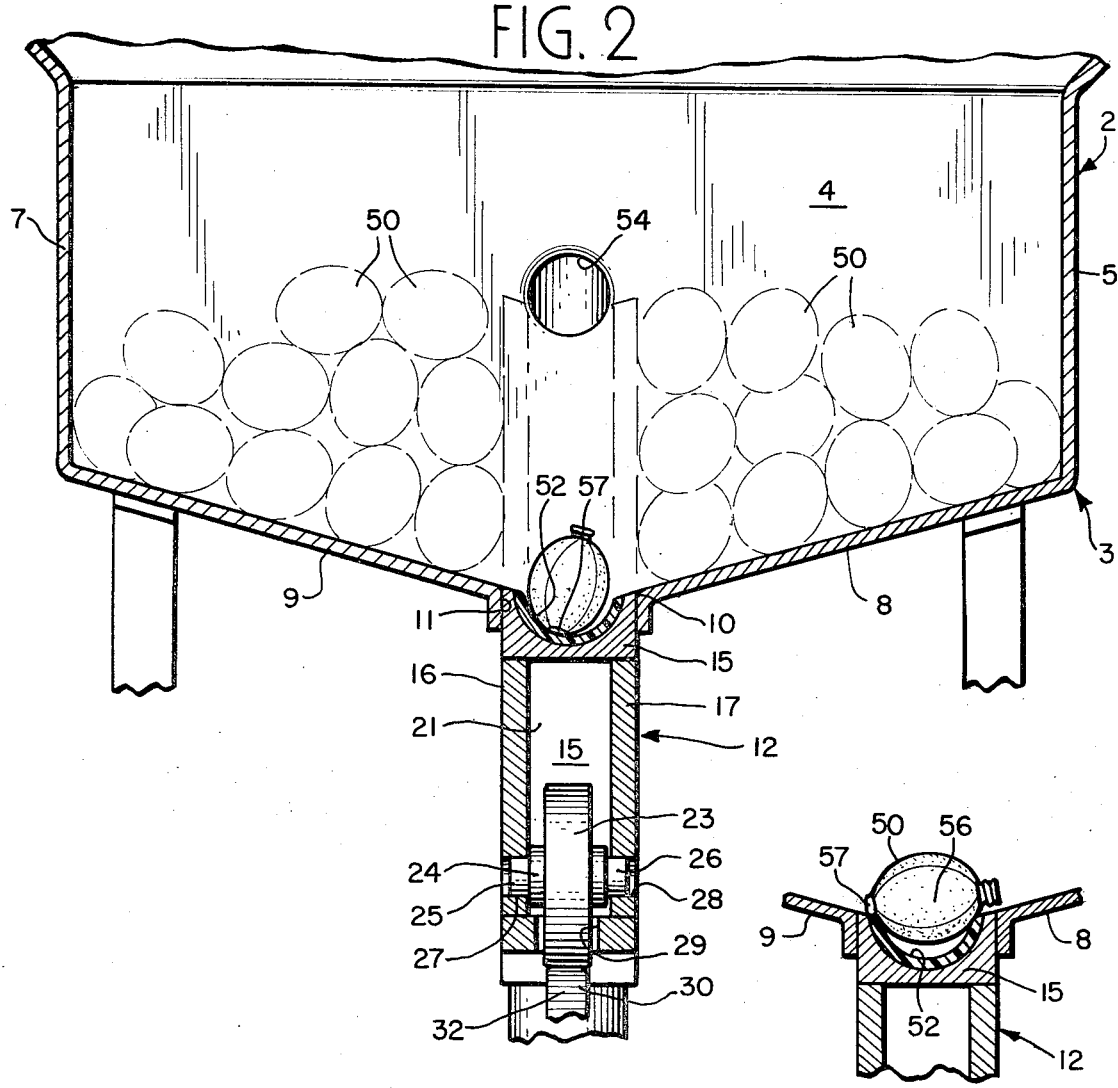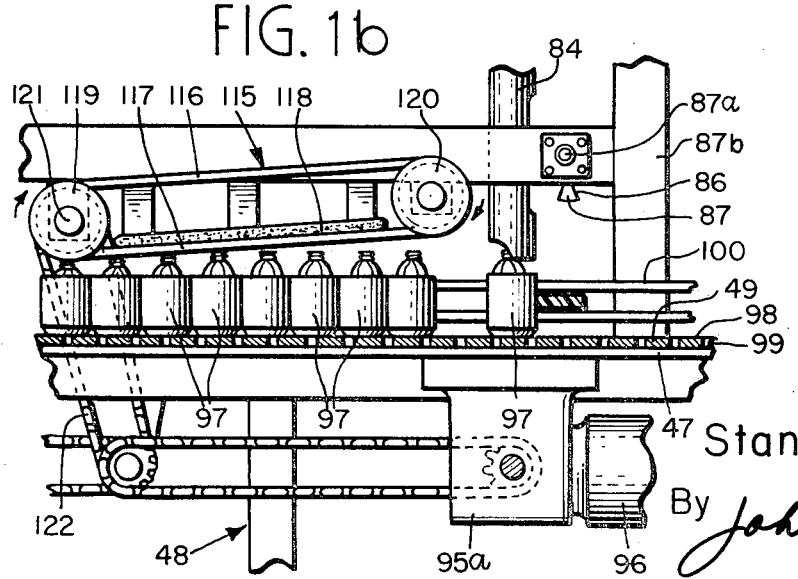

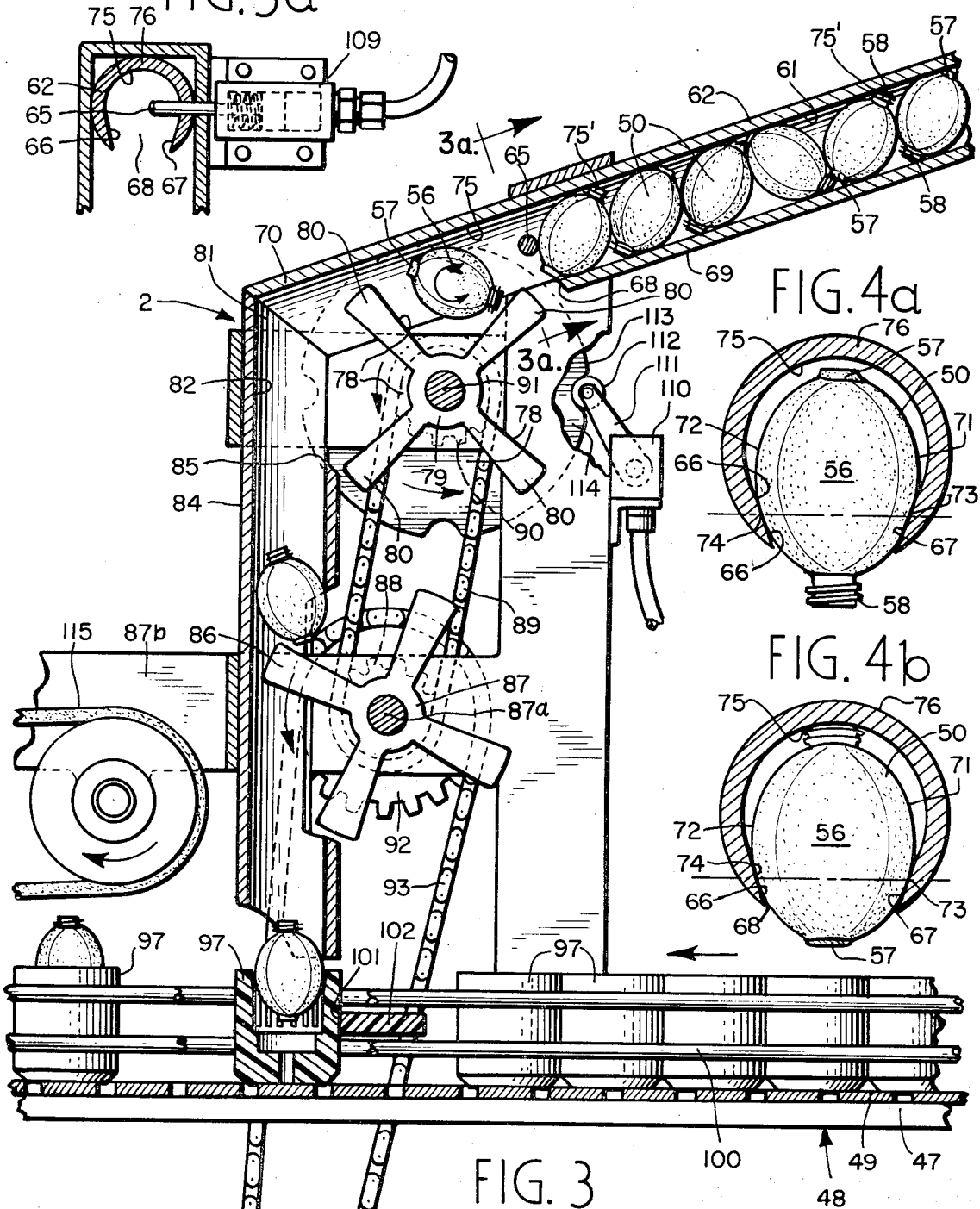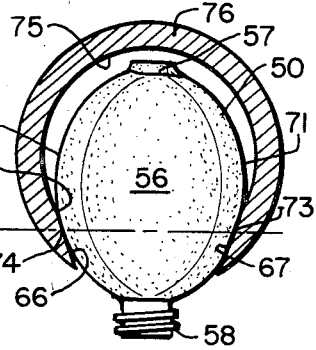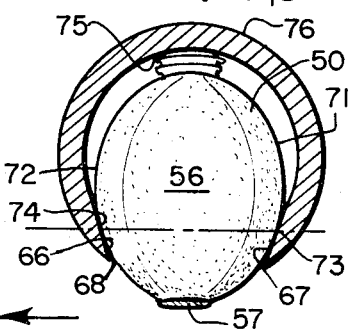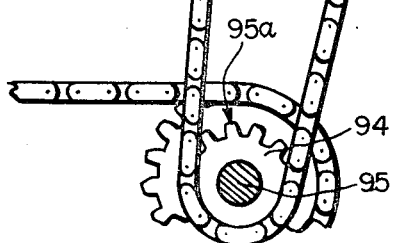

CONTAINER ORIENTING APPARATUS

DISCUSSION OF THE PRIOR ART

Heretofore no mechanism has been available which could orient containers having nonparallel sides. It was the tedious task for employees to take each such container and manually insert it into a holder which then was positioned upon a conveyor which carried the container to a filling station. This time-consuming and expensive operation virtually defied automation.

SUMMARY OF THE INVENTION

The general object of this invention is to provide a novel apparatus for orienting containers from a pile to upright fillable position.

A further object of the invention is to provide a novel and effective container-orienting device which is of simple and efficient construction and of 100 percent accuracy.

The device contemplates the provision of an inclined tube having an upper inlet end and a lower discharge end, the tube adjacent to its discharge end being slotted on its lower side to provide a pair of laterally spaced slide surfaces between which the lower portion of the container depending upon its orientation when entered into the inlet end of the tube, is adapted to enter such that if the container is upside down it will rotate about its intermediate portion which is wider than the space between the surfaces to upright position since the axis of rotation is below the center of gravity of the container and if the container is upright it will simply gravitate downwardly along the slide surfaces and its upper neck portion will engage the underside of the top portion of the tube.

In extension of the foregoing object it is a further object to provide at the discharge end of the tube a metering wheel which has a plurality of notches in its periphery defining pockets which are timed to accept the containers one by one as they gravitate down the tube and are individually released by a releasable stop correlated with the position of the metering wheel.

The invention comprehends the provision of a plurality of orienting mechanisms arranged in series one of these comprising a guide which ascillates vertically in a hopper and provides a grooved ramp in the upper edge thereof upon which the container slide to a second positioner in which the containers tip to proper position.

Specifically the invention in the illustrated embodiment provides an inclined tube having an upper end inlet and a lower end outlet the tube having a slot in its lower portion adjacent to its discharge end defined by laterally opposed surfaces spaced less than the width of the containers having non-parallel sides to be passed through the tube, the containers having a lower base and an upper neck and dimensioned such that when they slide down between the surfaces base end first they will be inclined, the base end projecting below the tube through the slot and the neck end abutting against the underside of the top portion of the tube and should any container slide down neck end first the distance between the axis of rotation of the container and the base end being less than the distance between said axis and the underside of the top portion of the tube will cause the container to turn over and orient with the base projecting through the slot and the neck end abutting said underside of the tube.

It will be understood that although the term "tube" is used it is intended to cover any hollow structure triangular, square, rectangular, etc. and includes structure where the side walls are made up of rods, strips, etc. or solid webs.

The invention comprehends as one of its features a novel positioner comprising a pair of laterally spaced surfaces providing an upper inlet and a lower outlet and defining a slot therebetween, the inclination of the surfaces being between 15° and 25° but preferably about 22.5° and functioning to receive therebetween a container having non-parallel sides of a width greater than the width of the slot, the container rotating between said surfaces from inverted to upright position and having its upper end abutting an overlying guide and abuttment surface.

These and other objects and advantages inherent in and encompassed by the invention will become more apparent from the specifications and the drawings wherein:

FIG. 1 is a cross-sectional fragmentary view of a sorting and positioning apparatus according to the invention;

FIG. 1a is an enlarged sectional view taken substantially on the line 1a—1a of FIG. 1;

FIG. 1b is an enlarged sectional view comparable to FIG. 1 of a portion thereof;

FIG. 2 is a cross-sectional view taken substantially on the line 2—2 of FIG. 1;

FIG. 2a is the same as FIG. 2 showing a cross-orientation of a container in the primary orientating device;

FIG. 3 is an enlarged sectional view in the same plane as FIG. 1, however, showing the left portion of the mechanism;

FIG. 3a is an enlarged cross-sectional view taken substantially on line 3a—3a of FIG. 3;

FIG. 4a is an enlarged cross-sectional view of the positioner showing the container therein in inverted position and;

FIG. 4b is a view similar to FIG. 4a showing the container in upright position.

DESCRIPTION OF THE INVENTION

Having reference to the drawings, there is shown a container positioner apparatus generally designated 2 comprising a hopper 3 which has a interconnected upright peripheral walls 4, 5, 6 and 7 which, at their lower ends, are connected to base walls 8 and 9 which converge downwardly to an apex 10 in which there is provided a slot 11 extending from wall 4 to wall 6 and which receives a center board structure 12 therein.

The center board structure 12 serves as a first orienting means and comprises an upper transverse wall 15 connected adjacent to its lateral edges to a pair of upright side walls 16 and 17 and end walls 18 and 19 which are connected to a bottom wall 20 to form a chamber 21.

A cam roller 23 is mounted on a shaft 24 extending transversely to walls 16 and 17 and having ends 25, 26 snugly fitted into apertures 27, 28 in said side walls 16 and 17 whereby the roller is connected thereto. The roller projects through a passage 29 in bottom wall 20 and rests upon the profile 30 of a cam 32. The cam 32 has a shaft 33 which rotates therewith and the shaft 33 is mounted on a support 34 which is carried upon a base wall 35.

The support includes a gear box housing 36 which mounts a suitable driving source such as an electric motor 37 which outputs through a gear train and drives a sprocket 39 that in turn drives a chain 40 trained about a sprocket 41 which is connected to the shaft 33 of the cam 32.

The profile of the cam 32 is essentially triangular and comprises a cam lobe having an arcuate contour. Rotation of the cam alternately elevates the center board which descends under its own weight as it is guided by front and rear guides 43, 43 each comprising an upper tube 44 connected at its upper end to the underside of the bottom wall 20 of the center board. Each tube telescopes over a guide pin 45 which is mounted in the base wall 35. The wall 35 is encompassed by walls 4–7 of the hopper and is connected to their lower edges.

The hopper is supported by corner feet 46, 46 which are connected at their upper ends to the bottom of base wall 35 and at their lower ends to a platform 47 of a frame 48 of a conveyor assembly generally designated 49.

The hopper is filled with a plurality of containers 50, 50 which are thrown helter-skelter therein and gravitate to the apex 10 and a row of such container align themselves into a U shaped groove 52 in the upper side of the wall 15. The wall 15 and the groove 52 slope downwardly toward the front wall 4 and in the upper position of the board as shown in phantom lines in FIG. 1 and leads into an exit opening 54 which is provided in the wall 4.

As best seen in FIG. 1, some of the containers 50, which in this instance are shown in the shape of lemons, each have a body portion 56 of fusiform shape tapering to a base 57 at one end and having an endwise projective threaded neck 58 at its other, normally upper, end.

Any container which positions crosswise as shown in FIG. 2a either sloughs off by abutment with the end wall 4 or reorients itself endwise lengthwise of the groove and enters the upper inlet end 60 of a passageway 61 in a cylindrical tube 62 of a second positioner. The tube 62 is inclined at the same angle as the groove 52 which is herein shown at about 22½° although tests have shown that inclinations of between 15°–25 from the horizontal are acceptable, however, optimum performance for the instant type of container has been obtained using an angle of 22½°.

The tube 62 is dimensioned diametrically less than the overall length of the container 50.

As best seen in FIG. 3, the containers slide down the tube 62, some of the containers being upright and some inverted. The lowermost container meets a stop 65 (FIGS. 3, 3a) and holds back the line of succeeding containers in the tube. As shown in FIG. 3 the container being oriented was inverted and had been released by the stop and entered between a pair of laterally spaced downwardly converging surfaces 66, 67 (FIGS. 4a, 4b) flanking a slot 68 formed in the lower portion 69 of the tube at the discharge end 70 thereof. As seen in FIG. 4a the container body being wider than the spacing between the surfaces 66, 67 prevents the container from falling through and the sides 71, 72 of the body, which being convex, have point contact at 73, 74 (FIG. 40) with surfaces 66, 67. The longer length of the portion of the container (FIG. 4a) above the axis of rotation x—x thereof and the inclination of the tube causes the container to rotate as shown in FIG. 3 since the base end 57 of the container clears the undersurface 75 of the upper portion 76 of the tube. The container thus tips over once and assumes the position shown in FIG. 4b and is prevented from tipping again through abutment of the neck portion 58 of the container with the surface 75 at 75' as also seen in FIG. 3.

Referring again to FIG. 3, the lowermost container 50 as it rights itself is entered into any one of the pockets 78, 78 of a metering wheel 79 which is herein shown as comprising four radial fingers 80, 80 spaced 90° apart and defining the aforesaid pocket 78. The fingers are timed to present an upwardly open pocket 78 directed toward the descending container being released by the stop 65 whereby the released container is free to tip or to slide down and then the finger therebehind enters the tube 62 through slot 68 and sweeps the container into the respective pocket and exits it from the delivery end of the inclined tube 62 into the upper end 81 of a passage 82 of a communicating tube 84, the fingers 80 exiting through slot 85 in the inner side of tube 84 and as the leading finger of each pocket recedes through slot 85 it lets drop the container seated thereupon upon a finger 86 of a second metering wheel 87 which is rotatable with a shaft 87a journalled on support from 87b. It will be observed that shaft 87a is connected to a sprocket 88 about which there is wrapped a chain 89 which also wraps about sprocket 90 connected to shaft 91 of wheel 79 mounted on a portion of frame 87. The two wheels rotate at substantially the same speed and the drive proceeds through a sprocket 92 which is connected to shaft 87a and driven by a chain 93 which is trained about sprocket 94 which is carried on shaft 95 operatively connected to a power train 95a herein shown as chain and sprocket drive and including a suitable power source such as an electric motor 96 (FIG. 1).

The containers drop base end down into cups 97 which travel on the top run 98 of a conveyor belt 99 which is supported on the frame 48.

The cups 97 are guided between rails 100 and are entered into notches 101 of a horizontal metering wheel 102 which is carried on a vertical shaft 103 journalled in bearings 104, 105 mounted on frame 48. The lower end of shaft 103 is provided with a bevel gear 106 which mates with a companion bevel gear 107 on shaft 95a, thus a proportional movement of the three metering wheels is always obtained since they are timed and thus the container will always drop into a cup.

The presence of a cup is sensed on the conveyor in position to be indexed by the metering wheel 102 by a switch 108 which is carried by frame 48 in the path of the cups. This switch 108 also controls operation of the switch or stop 65 through a monitoring switch 110 which is carried by frame 87b and has a arm 111 with a roller 112 riding on the profile 113 of a cam 114 connected to shaft 91. The switch 110 and stop switch 109 which controls stop 65 are coupled together so that they are timed to discharge a container when a pocket opens.

After the containers are cupped they are moved by the conveyor under tamper means generally designated and 115 comprising a belt 116 having a bottom run 117 (FIG. 1b) converging toward the conveyor therebelow in a downstream direction whereby the bottom run 117, which is backed against a plate 118 carried by the frame, engages the neck ends of the containers and presses the plastic containers into the holders or cups. The belt 116 is trained about pulleys 119 and 120 journalled on the frame. Pulley 119 is connected to shaft 121 which has a chain and sprocket drive 122 to the electric motor 96.

The containers are then moved to the filling and capping mechanism (not shown).

Having described a preferred form of the invention, it will be understood that the foregoing disclosure should not be interpreted as limiting the invention in any way. The claims are to be interpreted in their broadest aspects.

What is claimed is:

1. A device for orienting containers having nonparallel side portions, and a base end and an upper filler neck end comprising:
   a support,
   means providing inclined gravity feed passage means comprising a tube mounted on the support in inclined position at a small acute angle to the horizontal and having an upper end inlet for receiving such containers either end first,
   said tube having a diameter less than the lengths of such containers, and being essentially straight
   said tube having an upper container-abutment surface extending from one end of the tube to the other,
   and said tube having a lower end outlet,
   said tube having a slot extending lengthwise thereof in its lower end on the bottom side thereof providing container-embracing side surfaces therebetween spaced a distance apart less than the width of the container between said side portions thereof, said side surfaces being spaced vertically from said upper abutment surface a distance less than the distance lengthwise of the container from the points of contact of the side portions of the container with said side surfaces to said upper end of the container, and
   said slot permitting the container to tumble over, if inverted, and engage its neck end with said upper surface and slide down in upright position upon said side surfaces while the lower portion of the container protrudes through the slot and extends below the tube,
   said slot extending to said outlet.

2. A device according to claim 1 and said side surfaces converging downwardly.

3. The invention according to claim 2 and metering means extending through said slot having means accommodating positioning of a container entering into said slot and delivering an oriented container to associated mechanism.

4. The invention according to claim 3 and stop means extending into said passage means above the slot for intercepting such containers and metering the same individually to the slotted lower end of the tube.

5. The invention according to claim 1 and said containers being of fusiform shape and said lower surfaces embracing said container and at said slot providing an accomodation space for the end portions of the container to permit tumbling thereof.

6. The invention according to claim 1 and a hopper for receiving a plurality of containers and having bottom surfaces converging to an apex, a positioner extending from the bottom of said hopper through a passage therein and having an upper U-shaped groove inclined to a lower end toward one side wall of the hopper and operative to pick up a row of containers attendant to elevation of said positioner through said containers, said one wall having an opening therethrough positioned to register with said lower end of the groove in the elevated position of said positioner, and said upper end inlet communicating with said passage means.

7. The invention according to claim 1 and receptacle means for receiving said containers means for conveying container-filled receptacles along a certain path, means for tightly pressing said containers into said receptacle means and comprising an endless belt having a run overlying the container-filled receptacle means and converging with the conveyor means in a direction of movement thereof.

8. The invention according to claim 7 and means for positioning said receptacle means in receiving position to the containers and comprising a wheel superposed with respect to the conveyor means and having a series of notches receiving successive receptacle means, and means indexing said wheel to position each receptacle means in position to receive a container.

9. A device for orienting containers having fusiform shaped bodies with a neck at one end and a base at the other end, comprising:
   a support,
   an inclined cylindrical tube mounted on the support and having an upper end inlet for receiving such containers endwise in either upright position with the neck portion bearing against the underside of the upper portion of the tube or inverted with the base abutting the underside of said upper portion of the tube,
   said tube having a lower end portion providing an outlet,
   said lower end portion of the tube having a pair of circumferentially spaced side contact surfaces defining a slot therebetween open through said outlet and of a width less than the width of the bodies of the containers,
   said side contact surfaces at opposite sides of the slot adapted for contacting the body portion of the container passing therebetween,
   said container and tube proportioned to accommodate rotation of an inverted container by the container dropping to a position to clear the base end from the undersurface and said side surfaces spaced a distance from the undersurface less than the length of the container from the points of contact of the container with said surfaces to the neck in the upright position of the container and said surfaces spaced from the undersurface a distance greater than the length of an inverted container from the points of contact thereof with said surfaces and said undersurface,
   and said slot extending through the bottom of the tube lengthwise thereof.

10. The invention according to claim 9 and said tube disposed at an inclination of approximately 22½°.

* * * * *